US009358758B2

(12) United States Patent
Oda et al.

(10) Patent No.: US 9,358,758 B2
(45) Date of Patent: Jun. 7, 2016

(54) CENTRIFUGALLY CAST HOT-ROLLING COMPOSITE ROLL

(71) Applicant: HITACHI METALS, LTD., Tokyo (JP)

(72) Inventors: Nozomu Oda, Kitakyusyu (JP);
Takayuki Segawa, Kitakyusyu (JP);
Yasunori Nozaki, Yasugi (JP)

(73) Assignee: HITACHI METALS, LTD., Tokyo (JP)

( * ) Notice: Subject to any disclaimer, the term of this patent is extended or adjusted under 35 U.S.C. 154(b) by 0 days.

(21) Appl. No.: 14/758,694

(22) PCT Filed: May 2, 2014

(86) PCT No.: PCT/JP2014/062146
§ 371 (c)(1),
(2) Date: Jun. 30, 2015

(87) PCT Pub. No.: WO2014/178437
PCT Pub. Date: Nov. 6, 2014

(65) Prior Publication Data
US 2015/0336353 A1    Nov. 26, 2015

(30) Foreign Application Priority Data

May 2, 2013    (JP) .................................. 2013-097013

(51) Int. Cl.
*B32B 15/01*    (2006.01)
*B21B 27/02*    (2006.01)
(Continued)

(52) U.S. Cl.
CPC .............. *B32B 15/011* (2013.01); *B21B 27/00* (2013.01); *B21B 27/021* (2013.01); *B22D 19/16* (2013.01);
(Continued)

(58) Field of Classification Search
CPC ..................... Y10T 29/4956; Y10T 29/49563; C22C 37/00; C22C 37/04; B21B 27/032; B21B 27/021
See application file for complete search history.

(56) References Cited

U.S. PATENT DOCUMENTS 5,316,596 A    5/1994    Kataoka
5,514,065 A *  5/1996    Noda ..................... B21B 27/00
                                                29/895.32
(Continued)

FOREIGN PATENT DOCUMENTS

CN    1032262 C    7/1996
CN    101351569 A    1/2009
(Continued)

OTHER PUBLICATIONS

Communication dated Oct. 14, 2015 from the Korean Intellectual Property Office in counterpart application No. 10-2015-7011349.
(Continued)

*Primary Examiner* — Jason L Vaughan
(74) *Attorney, Agent, or Firm* — Sughrue Mion, PLLC

(57) ABSTRACT

A centrifugally cast hot-rolling composite roll comprising (a) an outer layer made of cast iron having a chemical composition comprising by mass 2.5-3.5% of C, 1.3-2.4% of Si, 0.2-1.5% of Mn, 3.5-5.0% of Ni, 0.8-1.5% of Cr, 2.5-5.0% of Mo, 1.8-4.0% of V, and 0.2-1.5% of Nb, the balance being Fe and inevitable impurities, a mass ratio of Nb/V being 0.1-0.7, and a mass ratio of Mo/V being 0.7-2.5, and meeting the condition of $2.5 \leq V+1.2Nb \leq 5.5$, and having a structure comprising 0.3-10% by area of a graphite phase; (b) a shaft portion made of ductile cast iron in which the area ratio of ferrite is 35% or less; and (c) an intermediate cast iron layer.

11 Claims, 5 Drawing Sheets

(51) Int. Cl.
  *B32B 1/00* (2006.01)
  *C22C 37/08* (2006.01)
  *C22C 37/10* (2006.01)
  *C22C 38/56* (2006.01)
  *C22C 38/54* (2006.01)
  *C22C 38/52* (2006.01)
  *C22C 38/50* (2006.01)
  *C22C 38/48* (2006.01)
  *C22C 38/46* (2006.01)
  *C22C 38/44* (2006.01)
  *C22C 38/34* (2006.01)
  *C22C 38/06* (2006.01)
  *C22C 38/04* (2006.01)
  *C22C 38/02* (2006.01)
  *B21B 27/00* (2006.01)
  *C22C 37/00* (2006.01)
  *C22C 37/04* (2006.01)
  *B22D 19/16* (2006.01)
  *B21B 27/03* (2006.01)
  *B22D 13/00* (2006.01)

(52) U.S. Cl.
  CPC . *B32B 1/00* (2013.01); *C22C 37/00* (2013.01); *C22C 37/04* (2013.01); *C22C 37/08* (2013.01); *C22C 37/10* (2013.01); *C22C 38/02* (2013.01); *C22C 38/04* (2013.01); *C22C 38/06* (2013.01); *C22C 38/34* (2013.01); *C22C 38/44* (2013.01); *C22C 38/46* (2013.01); *C22C 38/48* (2013.01); *C22C 38/50* (2013.01); *C22C 38/52* (2013.01); *C22C 38/54* (2013.01); *C22C 38/56* (2013.01); *B21B 27/032* (2013.01); *B22D 13/00* (2013.01); *B32B 2307/536* (2013.01); *B32B 2307/558* (2013.01); *C21D 2211/006* (2013.01)

(56) References Cited

U.S. PATENT DOCUMENTS

| | | | |
|---|---|---|---|
| 8,308,622 B2 | 11/2012 | Furushima et al. | |
| 9,044,807 B2* | 6/2015 | Oda | B21B 27/032 |
| 9,221,232 B2* | 12/2015 | Oda | B22D 13/02 |
| 2009/0092852 A1 | 4/2009 | Furushima et al. | |

FOREIGN PATENT DOCUMENTS

| | | |
|---|---|---|
| CN | 102392178 A | 3/2012 |
| CN | 102615106 A | 8/2012 |
| JP | 8-60289 A | 3/1996 |
| JP | 9-170041 A | 6/1997 |
| JP | 2000-160277 A | 6/2000 |
| JP | 2002-88444 A | 3/2002 |
| JP | 2002-88445 A | 3/2002 |
| JP | 2003-73767 A | 3/2003 |
| JP | 2003-342669 A | 12/2003 |
| JP | 2004-82209 A | 3/2004 |
| JP | 2004-162104 A | 6/2004 |
| JP | 2005-105296 A | 4/2005 |
| JP | 2009-66633 A | 4/2009 |
| JP | 4311073 B2 | 8/2009 |
| KR | 10-2008-0081199 A | 9/2008 |

OTHER PUBLICATIONS

Communication dated Nov. 23, 2015, from the European Patent Office in counterpart European Application No. 14791769.4.
International Search Report for PCT/JP2014/062146 dated Jun. 10, 2014.
Communication dated Jan. 22, 2016 from the State Intellectual Property Office of the P.R.C. in counterpart application No. 201480022521.5.

* cited by examiner

CENTRIFUGALLY CAST HOT-ROLLING COMPOSITE ROLL

CROSS REFERENCE TO RELATED APPLICATIONS

This application is a National Stage of International Application No. PCT/JP2014/062146 filed May 2, 2014 (claiming priority based on Japanese Patent Application No. 2013-097013 filed May 2, 2013), the contents of which are incorporated herein by reference in their entirety.

FIELD OF THE INVENTION

The present invention relates to a centrifugally cast hot-rolling composite roll comprising an outer layer having excellent wear resistance, sticking resistance and accident resistance, which is integral with a shaft portion having excellent toughness via an intermediate layer, particularly to a centrifugally cast hot-rolling composite roll suitable as a finish-rolling work roll in a hot strip mill for a thin steel strip.

BACKGROUND OF THE INVENTION

A hot slab as thick as several hundreds of millimeters produced by continuous casting, etc. is rolled to a steel strip as thick as several millimeters to several tens of millimeters by a hot strip mill comprising roughing rolls and finishing rolls. A finishing mill usually comprises 5 to 7 four-high rolling stands arranged in tandem. In the case of a 7-stand finishing mill, first to third stands are called front stands, and fourth to seventh stands are called rear stands.

Because work rolls used in such a hot strip mill come into contact with a hot-rolled, thin strip, damages such as wear, surface roughening, heat cracking, etc. occur on their outer layer surfaces by a thermal and mechanical rolling load. After these damages are removed by grinding, the work rolls are used again for rolling. The grinding of a surface layer of a roll outer layer to remove damages is called "dressing." After dressed from the initial diameter to the minimum diameter usable for rolling (discard diameter), the work roll is discarded. From the initial diameter to the discard diameter is called an effective rolling diameter. In the effective rolling diameter, an outer layer of a roll for hot rolling desirably has excellent wear resistance, sticking resistance and accident resistance, to prevent large surface damages such as heat cracking.

Dressing is classified to light dressing for removing surface damage due to usual rolling wear, and heavy dressing for removing surface damage due to rolling troubles. Particularly in rear finishing stands, a rolling trouble called "overlapped rolling," in which folded or cut steel strips are rolled in an overlapped state, is likely to occur. When such trouble occurs, the roll surface is locally subject to strong pressure, so that a steel strip sticks to a roll surface. As a result, cracking is generated and propagates in the roll due to high heat and load. Particularly cracks generated by the rolling trouble tend to be extremely deep. Accordingly, rolls for hot rolling are required to suffer little wear by rolling (have excellent wear resistance), to be resistant to sticking (have excellent sticking resistance), and to be resistant to the propagation of cracking (have excellent accident resistance) even in rolling troubles.

Thus proposed as work rolls used in finishing rear stands in hot strip mills, which are required to have excellent wear resistance, sticking resistance and accident resistance, are composite rolls comprising outer layers made of alloys containing hard-carbide-forming elements such as Mo, V, etc. to provide high-alloy grain cast irons having good sticking resistance with improved wear resistance.

For example, JP 2005-105296 A discloses an outer layer of a roll for hot rolling, which has a composition comprising by mass 2.5-3.5% of C, 1.0-2.5% of Si, 0.3-1% of Mn, 3-5% of Ni, 1.5-2.5% of Cr, 1.0-4% of Mo, 1.4-3.0% of V, 0.1-0.5% of Nb, and 0.0005-0.2% of B, the balance being Fe and inevitable impurities, and a structure comprising 50000-1000000/$mm^2$ of fine carbides having the maximum length of 0.1-5 μm in at least part of a matrix, thereby having excellent wear resistance and surface deterioration resistance. JP 2005-105296 A describes that the Ni grain roll is provided with improved wear resistance by MC carbides, with secondary carbides precipitated in a matrix to prevent surface roughening, and that for that structure, hardening is preferably conducted at 800-950° C. However, temperature difference occurs between the surface and inner portion of the roll in a cooling process from such hardening treatment, resulting in a residual compression stress applied to the roll surface. With this stress combined with a residual compression stress by the transformation expansion of the outer layer, the roll surface is subject to an extremely high residual compression stress. Thus, a high residual compression stress leads to cracking.

JP 2004-82209 A discloses a centrifugally cast hot-rolling composite roll comprising an outer layer having a chemical components comprising by mass 3.0-4.0% of C, 0.8-2.5% of Si, 0.2-1.2% of Mn, 3.0-5.0% of Ni, 0.5-2.5% of Cr, 0.1-3.0% of Mo, and 1.0-5.0% of V, the balance being Fe and inevitable impurities, and a shaft portion made of usual cast iron containing 2.5-4.0% of C or spheroidal graphite cast iron, the thickness T of the outer layer and the radius R of the shaft portion meeting the relation of 0.03≤T/R≤0.5. This composite roll has sticking resistance and wear resistance, free from breakage when produced, and spalling during use. However, with only a tempering treatment at 430° C. conducted as a heat treatment, the roll outer layer has insufficient hardness, and thus poor wear resistance.

JP 2002-88444 A discloses a composite roll comprising an outer layer made of a wear-resistant cast iron, an intermediate layer fused to an inner surface of the outer layer, and a shaft portion fused to an inner surface of the intermediate layer, the outer layer having a chemical composition comprising by weight 1.0-3.0% of C, 0.1-2.0% of Si, 0.1-2.0% of Mn, 0.1-4.5% of Ni, 3.0-10.0% of Cr, 0.1-9.0% of Mo, 1.5-10.0% of W, and 3.0-10.0% in total of V and/or Nb, the balance being substantially Fe; the intermediate layer having a chemical composition comprising by weight 1.0-2.5% of C, 0.2-3.0% of Si, 0.2-1.5% of Mn, 4.0% or less of Ni, 4.0% or less of Cr, 4.0% or less of Mo, 12% or less in total of W and/or V, and 12% or less in total of at least one of W, V and Nb, the balance being substantially Fe; and the shaft portion being made of flaky graphite cast iron, spheroidal graphite cast iron or graphite steel. However, because the outer layer contains as much as 3.0-10.0% of Cr, graphite is unlikely precipitated, resulting in poor sticking resistance and fracture toughness. Also, the precipitation of Cr carbides ($M_7C_3$, $M_{23}C_6$, etc.) provides the outer layer with low fracture toughness, by which the outer layer suffers more propagation of cracks by rolling troubles.

JP 09-170041 A discloses a centrifugally cast roll comprising a graphite-containing outer layer and a ductile cast iron shaft integrally fused via an intermediate layer of graphite steel, the outer layer comprising 2.5-4.7% of C, 0.8-3.2% of Si, 0.1-2.0% of Mn, 0.4-1.9% of Cr, 0.6-5.0% of Mo, 3.0-10.0% of V, and 0.6-7.0% of Nb, meeting the following formulae (1)-(4):

$$2.0+0.15V+0.10Nb \leq C\ (\%) \tag{1},$$

$$1.1 \leq Mo/Cr \tag{2},$$

$$Nb/V \leq 0.8 \quad (3), \text{ and}$$

$$0.2 \leq Nb/V \quad (4),$$

the balance being Fe and inevitable impurities; the shaft comprising 2.8-3.8% of C, 2.0-3.0% of Si, 0.3-1.0% of Mn, 0.10% or less of P, 0.04% or less of S, 0.3-2.0% of Ni, 1.5% or less of Cr, and 1.0% or less of Mo, the balance being Fe and inevitable impurities; and the intermediate layer comprising 1.0-2.0% of C, 1.6-2.4% of Si, 0.2-1.0% of Mn, 0.05% or less of P, 0.03% or less of S, 0.1-3.5% of Ni, 1.5% or less of Cr, and 0.1-0.8% of Mo, the balance being Fe and inevitable impurities. However, when the intermediate layer is made of graphite steel, the intermediate layer has higher solidification start temperature than that of the outer layer, so that casting defects such as shrinkage cavities, etc. likely occur in the outer layer or the intermediate layer.

OBJECT OF THE INVENTION

Accordingly, an object of the present invention is to provide a centrifugally cast hot-rolling composite roll having excellent wear resistance and sticking resistance, as well as excellent accident resistance because of high fracture toughness, with good melt-bonding between an outer layer and an intermediate layer, and between an intermediate layer and an shaft portion, with few speck-like segregated dendrites of bainite and/or martensite in the outer layer, and excellent radial uniformity in the outer layer structure, which is suitable for finishing rear work rolls in a hot strip mill.

SUMMARY OF THE INVENTION

The centrifugally cast hot-rolling composite roll of the present invention comprises (a) an outer layer made of cast iron having a chemical composition comprising by mass 2.5-3.5% of C, 1.3-2.4% of Si, 0.2-1.5% of Mn, 3.5-5.0% of Ni, 0.8-1.5% of Cr, 2.5-5.0% of Mo, 1.8-4.0% of V, and 0.2-1.5% of Nb, the balance being Fe and inevitable impurities, a mass ratio of Nb/V being 0.1-0.7, and a mass ratio of Mo/V being 0.7-2.5, and meeting the condition of $2.5 \leq V+1.2Nb \leq 5.5$, and having a structure comprising 0.3-10% by area of a graphite phase; (b) a shaft portion made of ductile cast iron in which the area ratio of ferrite is 35% or less; and (c) an intermediate cast iron layer.

It is preferable that the total amount of V and Nb in the intermediate layer near the boundary with the shaft portion is 70% or less of that at the discard diameter of the outer layer; and that the Cr content in the intermediate layer near the boundary with the shaft portion is 80% or more of that at the discard diameter of the outer layer.

The outer layer may further contain 0.1-5.0% of W.

The chemical composition of the outer layer preferably meets the conditions of the following formulae (1)-(3):

$$Si \leq 3.2/[0.283(C-0.2V-0.13Nb)+0.62] \quad (1),$$

$$(C-0.2V-0.13Nb)+(Cr+Mo+0.5W) \leq 9.5 \quad (2), \text{ and}$$

$$1.5 \leq Mo+0.5W \leq 5.5 \quad (3).$$

The outer layer may further contain at least one selected from the group consisting of 0.003-5.0% of Ti, 0.01-2.0% of Al, 0.01-0.5% of Zr, 0.001-0.5% of B, and 0.1-10.0% of Co by mass.

The matrix of the outer layer preferably has Vickers hardness of 560 or more.

The circumferential residual compression stress of the outer layer surface at a longitudinal roll center is preferably 150-500 MPa at the discard diameter.

The outer layer preferably has fracture toughness $K_{IC}$ of 18.5 MPa·m$^{1/2}$ or more.

The matrix of the outer layer preferably contains 3.2% or less by mass of Si.

BRIEF DESCRIPTION OF THE DRAWINGS

FIG. 4-1 is a graph schematically showing the distributions of Cr, V and Nb near a boundary between an intermediate layer and a shaft portion.

FIG. 4-2 is a graph showing a method for determining a boundary from the distribution of Cr.

FIG. 4-3 is an enlarged partial cross-sectional view showing a boundary between an intermediate layer and a shaft portion and its vicinity, which shows the definition of the total amount of V and Nb and Cr near the boundary of the intermediate layer with the shaft portion.

FIG. 5-1 is a graph showing the distributions of Cr, V and Nb near the intermediate layer of Example 8.

FIG. 5-2 is a graph showing the distributions of Cr, V and Nb near the intermediate layer of Example 9.

DESCRIPTION OF THE PREFERRED EMBODIMENTS

Figure 1:
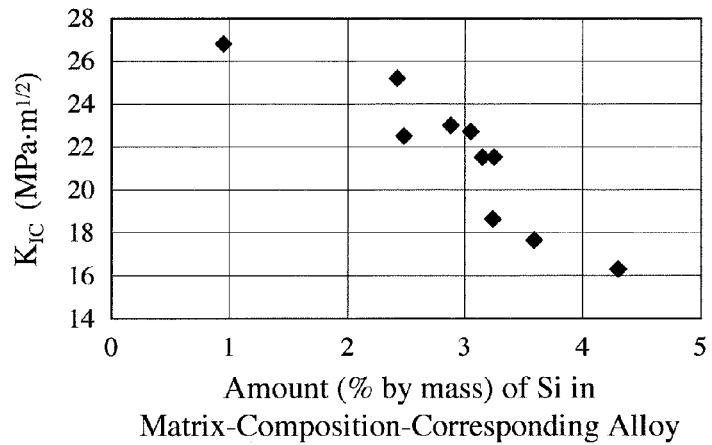
FIG. 1 is a graph showing the relation between the amount of Si and fracture toughness $K_{IC}$ in a matrix-composition-corresponding alloy.

The embodiments of the present invention will be explained in detail below without intention of restricting the present invention thereto. Various modifications may be made unless they deviate from the scope of the technical idea of the present invention. When the amount is expressed simply by "%," it means "% by mass" unless otherwise mentioned.

[1] Structure of Centrifugally Cast Hot-Rolling Composite Roll (A) Outer Layer (1) Composition (i) Indispensable Composition (a) C: 2.5-3.5% by Mass C is combined with V, Nb, Cr, Mo and W to form hard carbides, contributing to improving the wear resistance. It is also precipitated as graphite in the structure by graphitization-promoting elements such as Si and Ni, etc., thereby providing the outer layer with sticking resistance and improved toughness. When C is less than 2.5% by mass, the amounts of graphite and hard carbides precipitated are not enough, failing to provide the outer layer with sufficient wear resistance. Further, because less than 2.5% by mass of C provides large temperature difference between the precipitation of austenite and the precipitation of eutectic carbides, austenite tends to move outward by a centrifugal force, so that carbon is concentrated in an inside region of the outer layer melt. As a result, coarse dendrites of austenite are likely generated and grow in the carbon-concentrated melt. The dendrites of austenite are transformed to bainite and/or martensite, resulting in coarse speck-like segregations.

On the other hand, when C exceeds 3.5% by mass, excessive graphite having a string-like shape is formed, providing the outer layer with low strength. Also, carbides are excessively precipitated, providing the outer layer with reduced toughness and cracking resistance, so that deep cracks are formed by rolling in the outer layer, resulting in increased roll loss. The lower limit of the C content is preferably 2.55% by mass, more preferably 2.65% by mass. The upper limit of the C content is preferably 3.45% by mass, more preferably 3.4% by mass, most preferably 3.35% by mass.

(b) Si: 1.3-2.4% by Mass

Si acting to deoxidize the melt to reduce oxide defects has a function to promote the precipitation of graphite, improving sticking resistance and suppressing the propagation of cracking. When Si is less than 1.3% by mass, the melt is not sufficiently deoxidized, with little precipitation of graphite. On the other hand, when Si exceeds 2.4% by mass, the alloy matrix becomes brittle, providing the outer layer with reduced toughness. The lower limit of the Si content is preferably 1.4% by mass, more preferably 1.5% by mass. The upper limit of the Si content is preferably 2.3% by mass, more preferably 2.25% by mass, most preferably 2.2% by mass.

(c) Mn: 0.2-1.5% by Mass

Mn has a function of deoxidizing the melt, and a function of fixing S, an impurity, as MnS. When Mn is less than 0.2% by mass, these effects are insufficient. On the other hand, even if Mn exceeds 1.5% by mass, further effects are not obtained. The lower limit of the Mn content is preferably 0.3% by mass, more preferably 0.4% by mass, most preferably 0.5% by mass. The upper limit of the Mn content is preferably 1.4% by mass, more preferably 1.3% by mass, most preferably 1.2% by mass.

(d) Ni: 3.5-5.0% by Mass

Ni has a function of precipitating graphite, contributing to sticking resistance. Ni also has a function of improving the hardenability of the matrix structure. In the present invention, hardening is preferably not conducted to limit the residual compression stress on the roll surface. Without hardening, the outer layer should be made harder by cooling after casting. Accordingly, the outer layer should have such hardenability that cooling in the centrifugally cast mold causes bainite transformation or martensite transformation without pearlite transformation. When Ni is less than 3.5% by mass, such function is not sufficiently obtained. On the other hand, more than 5.0% by mass of Ni provides too stable austenite, making transformation to bainite or martensite unlikely. The lower limit of the Ni content is preferably 3.6% by mass, more preferably 3.8% by mass, most preferably 3.9% by mass. The upper limit of the Ni content is preferably 4.9% by mass, more preferably 4.8% by mass, most preferably 4.7% by mass.

(e) Cr: 0.8-1.5% by Mass

Cr is an effective element of improving the hardenability, and forming a bainite or martensite matrix, thereby keeping hardness and thus wear resistance. Less than 0.8% by mass of Cr would not provide sufficient effects. On the other hand, more than 1.5% by mass of Cr would hinder the precipitation of graphite, and form coarse eutectic carbides, resulting in low fracture toughness. The upper limit of the Cr content is preferably 1.45% by mass, more preferably 1.4% by mass, most preferably 1.35% by mass.

(f) Mo: 2.5-5.0% by Mass

Mo is combined with C to form hard Mo carbides ($M_6C$, $M_2C$), thereby increasing the hardness of the outer layer and improving the hardenability of the matrix. Also, Mo forms tough and hard MC carbides with V and Nb, improving the wear resistance. In addition, Mo increases the specific gravity of a residual eutectic melt during the solidification process of the alloy melt, prevents the centrifugal separation of a primary γ-phase, and suppresses speck-like segregated dendrites of bainite and/or martensite. When Mo is less than 2.5% by mass, these effects are insufficient. On the other hand, more than 5.0% by mass of Mo provides the outer layer with low toughness, with higher tendency of white solidification to hinder the precipitation of graphite, and with reduced fracture toughness. The lower limit of the Mo content is preferably 2.6% by mass, more preferably 2.7% by mass. The upper limit of the Mo content is preferably 4.6% by mass, more preferably 4.4% by mass, most preferably 4.2% by mass.

(g) V: 1.8-4.0% by Mass

V is an element combined with C to form hard MC carbides. MC carbides have Vickers hardness Hv of 2500-3000, hardest among all carbides. When V is less than 1.8% by mass, the amount of MC carbides precipitated is insufficient. On the other hand, when V exceeds 4.0% by mass, MC carbides having small specific gravities are concentrated in an inside region of the outer layer by a centrifugal force during centrifugal casting, so that MC carbides are extremely segregated radially, and that MC carbides become coarser, thereby making the alloy structure coarser. As a result, surface roughening likely occurs during rolling. The amount of MC carbides, which are based on V, Nb or Mo, is correlated with the amounts of not only V but also Nb, as described below. Further, the interaction of V with other elements changes the amount of Si dissolved in the matrix and the amount of coarse carbides formed, as described below. The lower limit of the V content is preferably 2.0% by mass, more preferably 2.1% by mass, most preferably 2.2% by mass. The upper limit of the V content is preferably 3.9% by mass, more preferably 3.8% by mass, most preferably 3.7% by mass.

(h) Nb: 0.2-1.5% by Mass

Nb is combined with C to form MC carbides. Nb added together with V and Mo is dissolved in MC carbides to strengthen them, thereby improving the wear resistance of the outer layer. NbC-based MC carbides, which are less different from the melt in density than VC-based MC carbides, alleviate the segregation of MC carbides. Further, Nb increases the specific gravity of a residual eutectic melt during the solidification process of the alloy melt, and prevents the centrifugal separation of a primary γ-phase, thereby suppressing the speck-like segregation of dendritic bainite and/or martensite transformed from austenite. With less than 0.2% by mass of Nb, these effects are insufficient. On the other hand, when Nb exceeds 1.5% by mass, MC carbides are aggregated, making it difficult to obtain a sound outer layer. The lower limit of the Nb content is preferably 0.3% by mass, more preferably 0.4% by mass. The upper limit of the Nb content is preferably 1.4% by mass, more preferably 1.3% by mass, most preferably 1.2% by mass.

(i) Nb/V: 0.1-0.7, Mo/V: 0.7-2.5, and V+1.2Nb: 2.5-5.5% by Mass

Because any of V, Nb and Mo has a function to increase hard MC carbides indispensable for wear resistance, the total amount of these elements should be equal to or more than a predetermined level. V is an element of decreasing the specific gravity of the melt, while Nb and Mo are elements of increasing the specific gravity of the melt. Accordingly, without a good balance of the amount of V to the amounts of Nb and Mo, the melt has large difference from austenite in specific gravity, resulting in remarkable concentration of carbon by the movement of austenite toward outside by a centrifugal force, so that dendrites of austenite are likely segregated.

Accordingly, a mass ratio of Nb/V is 0.1-0.7, a mass ratio of Mo/V is 0.7-2.5, and V+1.2Nb is 2.5-5.5% by mass. With Nb/V, Mo/V and V+1.2Nb in these ranges, proper amounts of Nb and Mo are introduced into V-based carbides, resulting in heavier carbides. As a result, a more uniform dispersion of carbides is obtained, preventing the speck-like segregation of dendrites of bainite and/or martensite. Particularly, when V+1.2Nb exceeds 5.5%, excessively precipitated MC carbides having small specific gravities are concentrated in an inside portion of the outer layer in the centrifugal casting process, hindering the fusion of the outer layer to the intermediate layer.

The lower limit of the mass ratio of Nb/V is preferably 0.12, more preferably 0.14, most preferably 0.18. The upper limit of the mass ratio of Nb/V is preferably 0.6, more preferably 0.55, most preferably 0.5.

The lower limit of the mass ratio of Mo/V is preferably 0.75, more preferably 0.8, most preferably 0.85. The upper limit of the mass ratio of Mo/V is preferably 2.2, more preferably 1.95, most preferably 1.75.

The lower limit of V+1.2Nb is preferably 2.6% by mass, more preferably 2.7% by mass, most preferably 2.8% by mass. The upper limit of V+1.2Nb is preferably 5.35% by mass, more preferably 5.2% by mass, most preferably 5.0% by mass.

(ii) Arbitrary Composition

The outer layer of the centrifugally cast composite roll of the present invention may contain, in addition to the above indispensable composition requirement, at least one of the following elements.

(a) W: 0.1-5.0% by Mass

W is combined with C to form hard carbides of $M_6C$ and $M_2C$, contributing to improving the wear resistance of the outer layer. It is also dissolved in MC carbides to increase their specific gravities, thereby reducing their segregation. However, more than 5.0% by mass of W increases the specific gravity of the melt, making the segregation of carbides likely. Accordingly, the preferred amount of W, if any, is 5.0% or less by mass. On the other hand, less than 0.1% by mass of W does not have sufficient effects. The upper limit of the W content is preferably 4.5% by mass, more preferably 4.0% by mass, most preferably 3.0% by mass.

(b) Ti: 0.003-5.0% by Mass

Ti is combined with N and O, graphitization-hindering elements, to form oxides or nitrides, which are dispersed as nuclei in the melt to make MC carbides finer and homogeneous. However, more than 5.0% by mass of Ti increases the viscosity of the melt, making it likely to generate casting defects. Accordingly, the preferred amount of Ti, if any, is 5.0% or less by mass. On the other hand, less than 0.003% by mass of Ti does not have sufficient effects. The lower limit of the Ti content is preferably 0.005% by mass. The upper limit of the Ti content is more preferably 3.0% by mass, most preferably 1.0% by mass.

(c) Al: 0.01-2.0% by Mass

Al is combined with N and O, graphitization-hindering elements, to form oxides or nitrides, which are dispersed as nuclei in the melt to uniformly precipitate fine MC carbides. However, when Al exceeds 2.0% by mass, the outer layer becomes brittle, resulting in deteriorated mechanical properties. Accordingly, the preferred amount of Al is 2.0% or less by mass. On the other hand, less than 0.01% by mass of Al does not have sufficient effects. The upper limit of the Al content is more preferably 1.5% by mass, most preferably 1.0% by mass.

(d) Zr: 0.01-0.5% by Mass

Zr is combined with C to form MC carbides, thereby improving the wear resistance of the outer layer. Zr oxides generated in the melt act as crystallization nuclei, making the solidified structure finer. It also increases the specific gravities of MC carbides, preventing their segregation. However, more than 0.5% by mass of Zr undesirably forms inclusions. Accordingly, the Zr content is preferably 0.5% or less by mass. On the other hand, less than 0.01% by mass of Zr does not have sufficient effects. The upper limit of the Zr content is preferably 0.3% by mass, more preferably 0.2% by mass, most preferably 0.1% by mass.

(e) B: 0.001-0.5% by Mass

B acts to make carbides finer. A trace amount of B contributes to precipitating graphite. However, more than 0.5% by mass of B has a strong white solidification effect, making the precipitation of graphite unlikely. Accordingly, the B content is preferably 0.5% or less by mass. On the other hand, less than 0.001% by mass of B does not have sufficient effects. The upper limit of the B content is preferably 0.3% by mass, more preferably 0.1% by mass, most preferably 0.05% by mass.

(f) Co: 0.1-10.0% by Mass

Co is an element effective for strengthening the matrix structure. Co also makes the precipitation of graphite easier. However, more than 10% by mass of Co decreases the toughness of the outer layer. Accordingly, the Co content is preferably 10% or less by mass. On the other hand, less than 0.1% by mass of Co does not have sufficient effects. The upper limit of the Co content is preferably 8.0% by mass, more preferably 6.0% by mass, most preferably 4.0% by mass.

(g) Mo/Cr: 1.7-5.0

The mass ratio of Mo/Cr is preferably in a range of 1.7-5.0. With the mass ratio of Mo/Cr less than 1.7, the Mo content is insufficient relative to the Cr content, resulting in a decreased area ratio of Mo-based carbide particles. On the other hand, when the mass ratio of Mo/Cr is more than 5.0, Mo-based carbides increase and become coarser, resulting in low fracture toughness. Accordingly, the mass ratio of Mo/Cr is preferably 1.7-5.0. The lower limit of the mass ratio of Mo/Cr is more preferably 1.8. The upper limit of the mass ratio of Mo/Cr is more preferably 4.7, most preferably 4.5.

(iii) Preferred Composition Relations $$\text{(a) } Si \leq 3.2/[0.283(C-0.2V-0.13Nb)+0.62] \quad (1)$$

For the improved accident resistance, for example, the outer layer of a rear work roll in a hot strip mill should have as high fracture toughness as 18.5 $MPa \cdot m^{1/2}$ or more. Though the outer layer of the roll cannot be measured with respect to the fracture toughness of a matrix, the relation between the amount of dissolved Si and fracture toughness in the matrix of the outer layer of the roll can be presumed by investigating such relation on an alloy corresponding to the matrix of the outer layer of the roll (excluding the influence of carbides). Accordingly, to exclude the influence of carbides, the amount of C was reduced to 1% by mass, and the amounts of carbide-forming elements such as V, Nb, etc. were reduced, and various alloy samples having compositions corresponding to the matrix of the outer layer of the roll were prepared to measure their fracture toughness. FIG. 1 shows the relation between the amount of dissolved Si and fracture toughness in the matrix-composition-corresponding alloy. As shown in FIG. 1, when the amount of Si in the matrix-composition-corresponding alloy is 3.2% or less, the sample has fracture toughness of about 22 $MPa \cdot m^{1/2}$ or more. But, when Si exceeds 3.2%, the fracture toughness decreases to 19 $MPa \cdot m^{1/2}$ or less. This suggests that the fracture toughness of the matrix of the outer layer of the roll drastically decreases when the amount of Si in the matrix exceeds 3.2%. Intensive research on alloy compositions restricting the amount of Si in the matrix has revealed that to dissolve 3.2% or less of Si in the matrix, the condition of $Si \leq 3.2/[0.283(C-0.2V-0.13Nb)+0.62]$ should be met.

$$\text{(b) } (C-0.2V-0.13Nb)+(Cr+Mo+0.5W) \leq 9.5 \quad (2)$$

In the solidification process of a cast iron containing V, Nb, Cr, Mo and W, granular MC carbides of V and Nb, etc. and austenite are first precipitated, so that Cr, Mo and W are concentrated and precipitated as networked eutectic carbides of $M_2C$, $M_6C$, $M_7C_3$, $M_{23}C_6$, $M_3C$, etc. in a liquid phase. The fracture toughness of the outer layer largely depends on the amount and shape of carbides. Particularly, the fracture toughness becomes extremely lower with larger amounts of networked eutectic carbides, or with coarser networked eutectic carbides. When C is excessive relative to V and Nb forming MC carbides, and when excessive Cr, Mo and W are concentrated in a liquid phase in the solidification process, coarse carbides are formed, providing the outer layer with low fracture toughness. Whether or not C is excessive relative to V and Nb is determined by (C−0.2V−0.13Nb), and whether or not Cr, Mo and W are excessive is determined by (Cr+Mo+0.5W). Intensive research has revealed that the composition condition for avoiding fracture toughness decrease is to meet (C−0.2V−0.13Nb)+(Cr+Mo+0.5W)≤9.5. To achieve fracture toughness of 18.5 MPa·m$^{1/2}$ or more, the value of the left side should be 9.5 or less.

(c) 1.5≤Mo+0.5W≤5.5    (3)

Mo and W have a function to form hard carbides of MC, $M_2C$ or $M_6C$. because Mo has as large a function as two times that of W, the total amount of Mo and W may be expressed by (Mo+0.5W). To improve the wear resistance by forming carbides of $M_2C$ and $M_6C$, (Mo+0.5W) should be 1.5% or more. However, because too much (Mo+0.5W) increases networked eutectic carbides, (Mo+0.5W) should be 5.5% or less.

(iv) Impurities

The balance of the outer layer composition is substantially composed of Fe and inevitable impurities. Because P and S deteriorate the mechanical properties of the outer layer among inevitable impurities, their amounts are preferably as small as possible. Specifically, the P content is preferably 0.1% or less by mass, and the S content is preferably 0.1% or less by mass. As other inevitable impurities, elements such as Cu, Sb, Te, Ce, etc. may be 0.7% or less by mass in total.

(2) Structure

The outer layer of the centrifugally cast composite roll of the present invention has a structure comprising a matrix, graphite, MC carbides, cementite, and other carbides ($M_2C$, $M_6C$, etc.) than MC carbides and cementite. The structure of the outer layer of the centrifugally cast composite roll of the present invention comprises 0.3-10% by area of a graphite phase. The outer layer structure preferably comprises 3-20% by area of MC carbides. The matrix structure of the outer layer is preferably substantially composed of martensite, bainite or pearlite. The matrix structure of the outer layer preferably further comprises 15-45% by area of a cementite phase.

(a) Area Ratio of Graphite Phase: 0.3-10%

The area ratio of a graphite phase (graphite particles) precipitated in the outer layer structure is 0.3-10%. When the area ratio of a graphite phase is less than 0.3%, a sufficient effect of improving the sticking resistance of the outer layer is not obtained. On the other hand, when the graphite phase exceeds 10% by area, the outer layer has lowered mechanical properties. The area ratio of the graphite phase is preferably 0.5-8%, more preferably 1-7%.

(b) Area Ratio of MC Carbides: 3-20%

When the area ratio of MC carbides precipitated in the outer layer structure is less than 3%, the outer layer unlikely has sufficient wear resistance. Also, coexistence with graphite makes it difficult to have more than 20% by area of MC carbides.

(3) Properties (a) Wear Resistance

The wear resistance of the outer layer is obtained by hard carbides of MC, $M_2C$, $M_6C$, etc., and a hard matrix structure. Particularly MC carbides of V and Nb, etc. are extremely hard, and sufficient MC carbides are precipitated when (V+1.2Nb) is 2.5% or more by mass. The hard matrix structure is obtained by elements such as Mo, W, etc.

(b) Sticking Resistance

The sticking of a steel strip when rolled in an overlapped state can be effectively prevented by predetermined amounts of carbides, Si and graphite contained. Accordingly, 2.5% or more by mass of C and 1.3% or more by mass of Si are needed.

(c) Accident Resistance

Fracture toughness functions as an index of resistance to the propagation of cracking. The fracture toughness depends on the shape, size and amount of carbides, and the toughness of the matrix. Coarse carbides likely permit the propagation of cracking. It has been found that the generation of coarse carbides depends on the amount of C remaining in the melt after MC carbides are precipitated, and the amounts of Cr, Mo and W tending to form coarse carbides. As a result, it is possible to judge that the generation of coarse carbides lowering the fracture toughness is suppressed, when the sum of (C−0.2V−0.13Nb) expressing the amount of C remaining after the precipitation of MC carbides, and (Cr+Mo+0.5W) expressing the total amount of Cr, Mo and W is 9.5% or less by mass.

It has also been found that more than 3.2% by mass of Si dissolved in the matrix extremely decreases the fracture toughness of the matrix. To have 3.2% or less by mass of Si in the matrix, the condition of Si≤3.2/[0.283(C−0.2V−0.13Nb)+0.62] should be met.

(d) Residual Compression Stress

To prevent cracking, the outer layer of the roll should have a desired level of residual compression stress. However, residual compression stress exceeding the desired level accelerates the propagation of cracking. Residual stress is generated by elastic deformation due to strain difference between the outer layer and the shaft portion. As the outer layer gets thinner, it is subject to larger elastic deformation, resulting in larger residual compression stress. In the present invention, the circumferential residual compression stress of the outer layer surface is determined at a discard diameter providing the maximum residual compression stress, and at a longitudinal roll center. To prevent the generation and accelerated propagation of cracking, the residual compression stress of the outer layer at a discard diameter and a longitudinal roll center is preferably 150-500 MPa, more preferably 200-400 MPa.

To obtain such residual compression stress, tempering at 450-550° C. is conducted one or more times after casting. Keeping at 450-550° C. is preferably 1 hour or more. This tempering temperature transforms residual austenite to hard martensite or bainite, causing transformation expansion which provides residual compression stress to the roll surface. Such transformation provides the matrix with increased hardness and wear resistance. Incidentally, if the roll were heated to a temperature equal to or higher than the austenitization temperature (about 770° C. or higher) of the outer layer matrix for hardening, the roll surface would have residual compression stress of more than 500 MPa, likely resulting in the accelerated propagation of cracking.

(e) Vickers Hardness

The Vickers hardness of the outer layer matrix is preferably 560 or more. When the Vickers hardness of the outer layer matrix is less than 560, the matrix is predominantly worn and largely suffers the detachment of carbides by rolling. The Vickers hardness of 560 or more is obtained by adding Mo and W in amounts meeting 1.5≤(Mo+0.5W).

(B) Shaft Portion

To expand the life of a journal portion (shaft portion) as the life of the outer layer becomes longer, the journal portion should indispensably have improved wear resistance. If there were a large clearance between the worn journal portion and a bearing, the centrifugally cast composite roll would have to be inevitably discarded. To provide journal portions with high wear resistance, ductile cast iron containing 35% or less by area of ferrite is used in journal portions of the shaft portion coming into contact with bearings. The ductile cast iron tends to contain a reduced amount of carbon around spheroidal graphite particles, resulting in a low-hardness ferritic structure. The higher the area ratio of ferrite is, the lower hardness and thus lower wear resistance the matrix has. The area ratio of ferrite in ductile cast iron for the shaft portion is preferably 32% or less, more preferably 29% or less.

The area ratio of ferrite in the ductile cast iron is influenced by the amounts of alloying elements. The composition of ductile cast iron containing 35% or less by area of ferrite comprises by mass 2.3-3.6% of C, 1.5-3.5% of Si, 0.2-2.0% of Mn, 0.3-2.0% of Ni, 0.05-1.0% of Cr, 0.05-1.0% of Mo, 0.01-0.08% of Mg, and 0.05-1.0% of V, the balance being Fe and inevitable impurities. In addition to the above indispensable elements, it may contain 0.7% or less of Nb and 0.7% or less of W. To reduce the area ratio of ferrite, 0.005-0.5% in total of at least one of Cu, Sn, As and Sb may be added. Though about 0.005-0.05% of P is usually contained in the ductile cast iron as an impurity element, up to 0.5% of P may be added to reduce the area ratio of ferrite. The matrix of ductile cast iron is mainly composed of ferrite and pearlite, additionally containing mainly graphite and a trace amount of cementite.

(C) Intermediate Layer

Because an intermediate layer formed on an inner surface of the outer layer is distant from a surface of the centrifugal casting mold, it suffers less directional solidification, and tends to have more shrinkage cavities. However, because the Cr content in the intermediate layer near a boundary with the shaft portion is 80% or more of the Cr content at the discard diameter of the outer layer in the present invention, the intermediate cast iron layer contains enough eutectic carbides, preventing solidification shrinkage cavities during centrifugal casting. In addition, because the total amount of V and Nb in the intermediate layer near a boundary with the shaft portion is 70% or less of that at the discard diameter of the outer layer, less V and Nb are diffused from the outer layer to the shaft portion, resulting in higher bonding strength between the outer layer and the shaft portion. To have good fusion between the outer layer and the shaft portion, the average thickness of the intermediate layer is preferably 1-70 mm, more preferably 3-50 mm, most preferably 5-30 mm. The intermediate layer does not necessarily have uniform thickness over the entire bonded region, part of which may be thin.

(1) Melt Composition

In a melt for the intermediate layer, (a) the total amount of V and Nb is 50% or less of that in a melt for the outer layer, (b) the Cr content is 80% or more of that in the melt for the outer layer, and (c) the C content is within ±35% to that in the melt for the outer layer.

With respect to the composition requirement (a), when the total amount of V and Nb in the melt for the intermediate layer is more than 50% of that in the melt for the outer layer, V and Nb in the intermediate layer are diffused to the shaft portion when the melt for the shaft portion is cast, resulting in low bonding strength between the intermediate layer and the shaft portion. The total amount of V and Nb in the melt for the intermediate layer is preferably 45% or less, more preferably 40% or less, of that in the melt for the outer layer. Particularly the V content in the melt for the intermediate layer is preferably 0-3.0%, more preferably 0-2.8%. Also, the Nb content in the melt for the intermediate layer is preferably 0-3.0%, more preferably 0-2.8%.

With respect to the composition requirement (b), when the Cr content in the melt for the intermediate layer is less than 80% of that in the melt for the outer layer, more solidification shrinkage cavities are likely formed during centrifugal casting. The Cr content in the melt for the intermediate layer is preferably 82% or more, more preferably 85% or more, of that in the melt for the outer layer. Also, the Cr content in the melt for the intermediate layer is preferably 300% or less, more preferably 200% or less, of that in the melt for the outer layer. Particularly, the Cr content in the melt for the intermediate layer is preferably 0.8-3.3%, more preferably 0.8-3.0%.

With respect to the composition requirement (c), unless the C content in the melt for the intermediate layer differs within ±35% from that in the melt for the outer layer, the intermediate layer and the outer layer has low bonding strength due to a large C content difference. The C content in the melt for the intermediate layer differs preferably within ±30%, more preferably within ±25%, from that in the melt for the outer layer. Particularly, the C content in the melt for the intermediate layer is preferably 1.6-3.8%, more preferably 1.8-3.6%.

The preferred specific composition of the melt for the intermediate layer meeting the above composition requirements (a)-(c) comprises 1.6-3.8% of C, 0.2-3.5% of Si, 0.2-2.0% of Mn, 0-5.0% of Ni, 0.8-3.0% of Cr, 0-3.0% of Mo, 0-2.0% of V, 0-2.0% of Nb, and 0-3.0% of W, the balance being Fe and inevitable impurities. The upper limits of V and Nb contents are both preferably 0.5% more.

(2) Solidified Composition

With the intermediate layer formed on an inner surface of the outer layer, and the shaft portion formed on an inner surface of the intermediate layer, components in the outer layer are diffused to an outside region of the intermediate layer (closest to the inner surface of the outer layer). Accordingly, the solidification composition of the intermediate layer is different from the melt composition, having a gradient in a radial direction of the roll. Specifically, (a) the total amount of V and Nb in the intermediate layer near the boundary with the shaft portion is 70% or less of that at the discard diameter of the outer layer, and (b) the Cr content in the intermediate layer near the boundary with the shaft portion is 80% or more of that at the discard diameter of the outer layer. With the solidified composition requirements (a) and (b) in the intermediate layer met, high bonding strength (300 MPa or more of tensile strength) is obtained between the outer layer and the intermediate layer, and between the intermediate layer and the shaft portion. With respect to the composition requirement (a), the total amount of V and Nb in the intermediate layer near the boundary with the shaft portion is preferably 68% or less, more preferably 65% or less, of that at the discard diameter of the outer layer. With respect to the composition requirement (b), the Cr content in the intermediate layer near the boundary with the shaft portion is preferably 82% or more, more preferably 85% or more, of that at the discard diameter of the outer layer, and its upper limit is preferably 300% or less, more preferably 200% or less.

Because the intermediate layer is formed on an inner surface of the outer layer, and because the shaft portion is formed on an inner surface of the intermediate layer, components in the outer layer and the intermediate layer are diffused to each other in their boundary, and components in the intermediate layer and the shaft portion are also diffused to each other in their boundary. Accordingly, the concentrations of alloying elements substantially decrease as it goes from the outer layer to the shaft portion via the intermediate layer. Particularly in the boundary between the intermediate layer and the shaft portion having different concentrations of V, Nb and Cr, carbide-forming elements, the concentrations of these elements extremely decrease.

Figure 2:
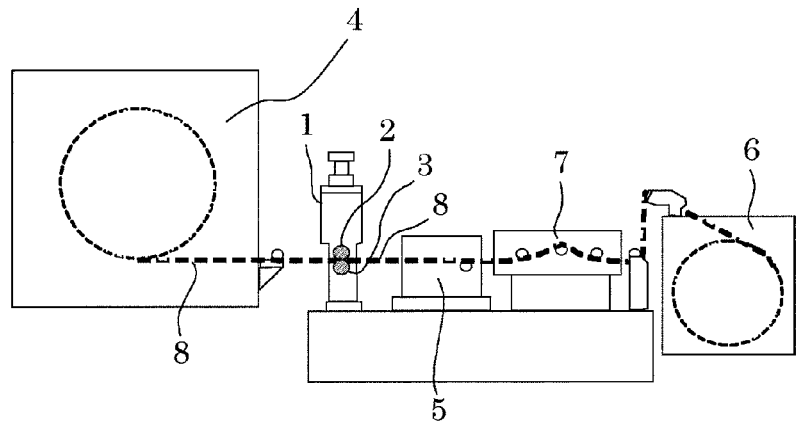
FIG. 2 is a schematic view showing a rolling wear test machine.
Figures 1, 4:
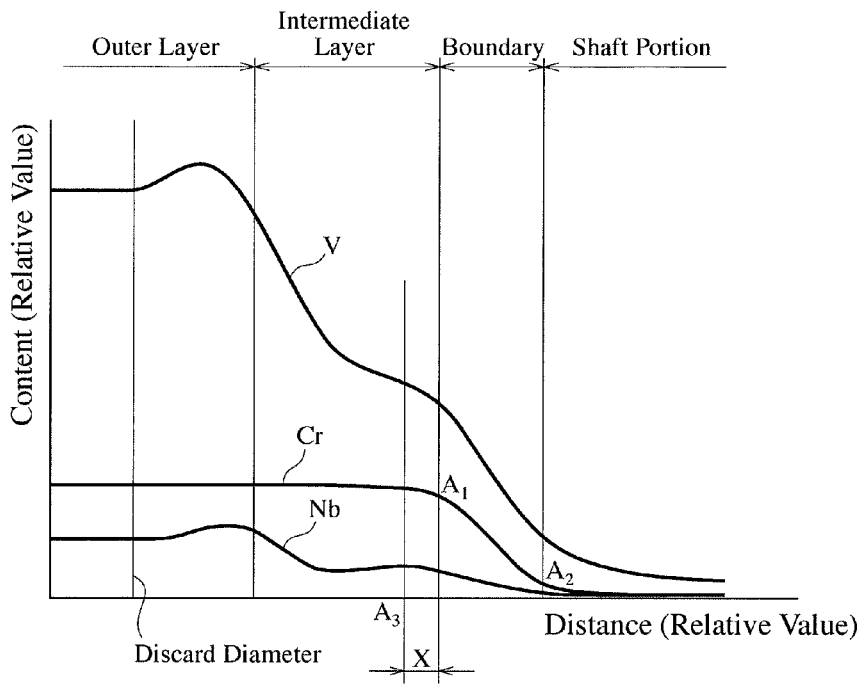
Figures 2, 4:
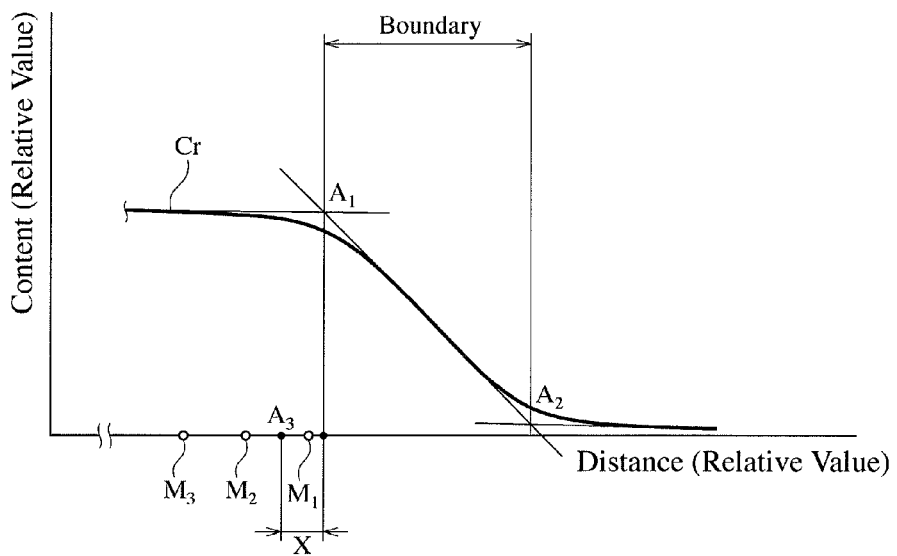
Figures 3, 4:
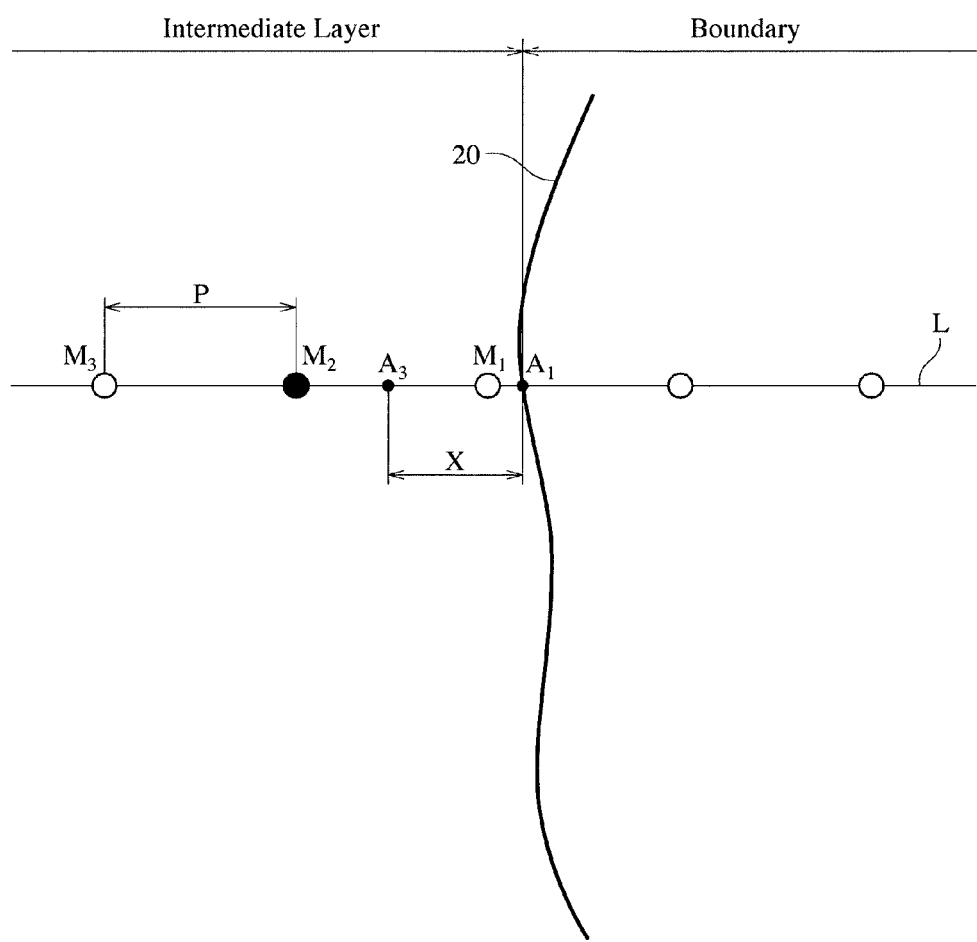

With an intermediate layer having a Cr content equal to or lower than that in the outer layer, investigation of the concentration changes of V, Nb and Cr in the boundary between the intermediate layer and the shaft portion has revealed that (a) the concentrations of V and Nb gradually decrease as it goes from the intermediate layer to the shaft portion as schematically shown in FIG. 4-1, making it difficult to identify a range of the boundary, and that (b) the concentration of Cr does not substantially change from the outer layer to the intermediate layer, drastically decreases in the boundary, and then becomes constant in the shaft portion as shown in FIG. 4-1. It has also been found that when an intermediate layer having a higher Cr content than that in the outer layer is formed, the concentration of Cr decreases at a larger gradient in the boundary. Because the concentration of Cr rapidly decreases in the boundary in any case, it is desirable to use the concentration of Cr to identify the boundary range. Thus, the inflection points $A_1$, $A_2$ of a Cr concentration curve are defined as the radially outermost and innermost positions of the boundary, as shown in FIG. 4-2. To determine such inflection points, it is preferable to analyze the concentration of Cr at a radial pitch of 3 mm or less.

Figure 3:
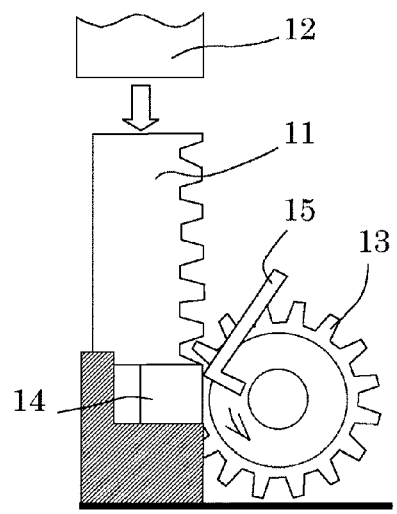
FIG. 3 is a schematic view showing a friction heat shock test machine.

FIG. 4-3 enlargedly shows a transverse cross section (cross section perpendicular to the axial direction) of the composite roll near the boundary. As shown in FIG. 4-3, the end 20 of the boundary does not usually have a constant radial position. Near the boundary having such end 20, the concentrations of V, Nb and Cr are measured along a radial straight line L at a constant pitch P, but it is very rare that any of the measured points $M_1$, $M_2$, $M_3$ . . . is positioned at the end 20 of the boundary. Namely, the outer end Al of the boundary is mostly not located on any of the measured points $M_1$, $M_2$, $M_3$ . . . . Thus, a radially outside position $A_3$ (on the intermediate layer side) distant from the outer end $A_1$ by distance X (=2 mm) is put on a radial straight line L, (a) when the position $A_3$ coincides with any one of the measured points, the concentrations of V, Nb and Cr at the position $A_3$ are used, and (b) when the position $A_3$ does not coincide with any measured point, the concentrations of V, Nb and Cr at the closest measured point (M2 in the depicted example) outside the position $A_3$ are used. Accordingly, the total amount of V and Nb at the position $A_3$ or the closest measured point M2 outside it is defined as "the total amount of V and Nb in the intermediate layer near the boundary with the shaft portion." Likewise, the Cr content at the position $A_3$ or the closest measured point M2 outside it is defined as "the Cr content in the intermediate layer near the boundary with the shaft portion." Examples of $M_1$, $M_2$, $M_3$ . . . are shown in FIG. 4-2.

Because the total amount of V and Nb in the intermediate layer near the boundary with the shaft portion varies relatively largely depending on the measurement position, an average of values measured at three arbitrary points by the above method is used in the present invention.

(D) Roll Size

Though not particularly restricted, a preferred example of the size of the centrifugally cast composite roll of the present invention is 200-1300 mm in an outer diameter of the outer layer, 500-6000 mm in a roll body, with a rolling usable layer (rolling effective diameter) as thick as 50-200 mm in the outer layer.

[2] Production Method of Centrifugally Cast Composite Roll

The centrifugally cast composite roll of the present invention is produced by (a) casting a melt for the outer layer having the above composition into a rotating cylindrical mold for centrifugal casting, (b) casting a melt for the intermediate layer into the resultant hollow outer layer during or after the solidification of the outer layer, (c) erecting the cylindrical mold containing the outer layer and the intermediate layer upright during or after the solidification of the intermediate layer, and mounting upper and lower molds to upper and lower ends of the cylindrical mold to constitute a stationary casting mold, and (d) casting a melt for the shaft portion into a cavity defined by the upper mold, the cylindrical mold containing the outer layer and the intermediate layer, and the lower mold. Incidentally, the cylindrical mold for forming the outer layer and the intermediate layer and the upper and lower molds for forming the shaft portion may be integral as a stationary casting mold.

(A) Formation of Outer Layer (1) Melt

The chemical composition of the outer layer melt comprises by mass 2.5-3.5% of C, 1.3-2.4% of Si, 0.2-1.5% of Mn, 3.5-5.0% of Ni, 0.8-1.5% of Cr, 2.5-5.0% of Mo, 1.8-4.0% of V, and 0.2-1.5% of Nb, the balance being Fe and inevitable impurities; a mass ratio of Nb/V being 0.1-0.7, a mass ratio of Mo/V being 0.7-2.5, and V+1.2Nb being 2.5-5.5%.

(2) Casting Temperature

The casting temperature of the outer layer melt is in a range of Ts+30° C. to Ts+180° C., wherein Ts is an austenite precipitation start temperature. The casting temperature in this range shortens a liquid-phase-remaining time, suppressing the centrifugal separation of a γ-phase precipitated from the liquid phase by solidification, and thus suppressing segregation. With the casting temperature lower than Ts+30° C., the cast melt is solidified too rapidly before the separation of foreign matter such as fine inclusions by a centrifugal force, likely resulting in defects by foreign matter. With the casting temperature higher than Ts+180° C., speck-like regions of aggregated coarse dendrites (segregated regions) are formed in the outer layer. The casting temperature is preferably Ts+30° C. to Ts+100° C., more preferably Ts+80° C. to Ts+100° C. The austenite precipitation start temperature Ts is an exothermal solidification start temperature measured by a differential thermal analyzer. Because the outer layer melt is usually cast into a centrifugal casting mold via a ladle, a funnel, a nozzle, etc., or via a tundish, a nozzle, etc., the casting temperature in the present invention is the temperature of the melt in the ladle or the tundish.

(3) Centrifugal Force

When the outer layer is cast into a centrifugal casting mold, the centrifugal force is in a range of 60-150 G by a gravity number. When cast at the gravity number in this range, the acceleration can be limited at the time of solidification, resulting in a low moving speed of a γ-phase, thereby suppressing the centrifugal separation (segregation) of the γ-phase. At the gravity number of less than 60 G, the outer layer melt is not sufficiently attached to an inner surface of the mold. On the other hand, when the gravity number exceeds 150 G, too much centrifugal separation of the γ-phase occurs, so that coarse dendrites are formed in a remaining melt with a fewer γ phase. As a result, speck-like segregated dendrites of bainite and/or martensite are formed in the outer layer. The gravity number (G No.) is expressed by the formula of G No.=N×N× D/1,790,000, wherein N is the number of revolution (rpm) of the mold, and D is the inner diameter (mm) of the mold (corresponding to the outer diameter of the outer layer).

(4) Centrifugally Casting Mold

The centrifugal casting mold is preferably formed by tough ductile cast iron as thick as 120-450 mm. When the mold is as thin as less than 120 mm, the mold has insufficient cooling capability, likely resulting in shrinkage cavities in the outer layer. On the other hand, if the thickness of the mold exceeded 450 mm, its cooling capability would be saturated. The more preferred thickness of the mold is 150-410 mm. The centrifugal casting mold may be horizontal, inclined or vertical.

(5) Facing Material

To prevent the outer layer from sticking to the mold, the inner surface of the mold is preferably coated with a facing material based on silica, alumina, magnesia or zircon at a thickness of 0.5-5 mm. When the facing material is thicker than 5 mm, the melt is cooled slowly, so that the liquid phase remains for a longer period of time, resulting in more centrifugal separation of the γ-phase, and thus more segregation. On the other hand, the facing material thinner than 0.5 mm provides an insufficient effect of preventing the outer layer from sticking to the mold. The more preferred thickness of the facing material is 0.5-4 mm.

(6) Inoculant

To adjust the amount of graphite precipitated, an inoculant such as Fe—Si, Ca—Si, etc. may be added to the melt. In this case, the melt composition is determined, taking into consideration composition change by the addition of the inoculant. Inoculation may be conducted by a method of adding the inoculant to the melt ejecting from a melting furnace, a method of adding the inoculant to the melt in the ladle, tundish, funnel, etc., a method of directly adding the inoculant to the melt in the mold, etc.

(B) Formation of Intermediate Layer

After casting the outer layer, or during or after the solidification of the outer layer, a melt for the intermediate layer is cast. In the intermediate layer melt, (a) the total amount of V and Nb is 50% or less of that in the melt for the outer layer, (b) the Cr content is 80% or more of that in the outer layer melt, and (c) the C content differs within ±35% from that in the outer layer melt. Because the intermediate layer is solidified after the inner surface of the outer layer is remelted, they are metallurgically bonded.

(C) Formation of Shaft Portion

During or after the solidification of the intermediate layer, the mold containing the outer layer and the intermediate layer is erected, and upper and lower molds are mounted to upper and lower ends of the mold to constitute a stationary casting mold. Because the upper and lower molds are communicating with the mold containing the outer layer and the intermediate layer, an integral space (cavity) is defined by the upper mold, the mold containing the outer layer and the intermediate layer, and the lower mold. A ductile cast iron melt for the shaft portion is cast into the cavity. Because the shaft portion is solidified after the inner surface of the intermediate layer is remelted, they are metallurgically bonded.

Because elements in the outer layer and the intermediate layer are diffused to each other through their boundary, the composition of the solidified intermediate layer not only differs from the composition of its melt, but also has a gradient. Specifically, the total amount of V and Nb in the intermediate layer near the boundary with the shaft portion is 70% or less, preferably 60% or less, more preferably 50% or less, most preferably 40% or less, of that at the discard diameter of the outer layer.

(D) Heat Treatment

In order that the outer layer surface has circumferential residual compression stress of 150-500 MPa at the discard diameter and at a longitudinal center of the composite roll, a tempering treatment at 400-550° C. is conducted one or more times after casting the shaft portion, though hardening is desirably not conducted.

The present invention will be explained in further detail by Examples below, without intention of restricting the present invention thereto.

EXAMPLES 1-7

COMPARATIVE EXAMPLES 1-5

(1) Production of Composite Roll

Each melt having a composition (% by mass) shown in Table 1 was poured into a centrifugal casting cylindrical mold of 400 mm in inner diameter, 1500 mm in length and 276 mm in thickness, which was made of ductile cast iron, coated with a zircon-based facing material as thick as 3 mm on the inner surface, and was rotated at a high speed, to centrifugally cast an outer layer. The casting temperature of a melt for the outer layer was between Ts+80° C. and Ts+100° C., wherein Ts is an austenite precipitation start temperature. The gravity number on the outer layer was 120 G. The outer layer thus obtained had an average thickness of 96 mm, and a discard diameter of 65 mm from the surface.

Before the solidification of the inner surface of the outer layer was completed, a melt for an intermediate layer having a composition comprising by mass 3.1% of C, 1.5% of Si, 0.9% of Mn, 2.8% of Ni, 1.0% of Cr, 0.2% of Mo, and 0.1% of V, the balance being Fe and inevitable impurities (0.03% or less of P, 0.02% or less of S, and other impurities) was poured into the outer layer, to centrifugally cast the intermediate layer. The casting temperature for the intermediate layer melt was 1362° C. The hollow intermediate layer thus obtained had an average thickness of 15 mm. Ultrasonic inspection convinced that the outer layer and the intermediate layer were soundly fused to each other without defects.

After the hollow intermediate layer was solidified, the rotation of the centrifugally casting cylindrical mold was stopped, and an upper mold (length: 1000 mm) and a lower mold (length: 1000 mm) were respectively attached to upper and lower ends of the cylindrical mold, to constitute a stationary casting mold. A ductile cast iron melt for a shaft portion having a composition comprising 3.2% of C, 2.6% of Si, 0.6% of Mn, 0.03% or less of P, 0.6% of Ni, 0.1% of Cr, 0.1% of Mo, 0.1% of V, and 0.07% of Mg, the balance being substantially Fe and inevitable impurities, was poured into a cavity of the stationary casting mold constituted by the upper mold, the intermediate-layer-comprising mold and the lower mold, to stationarily cast the shaft portion. The casting temperature of the ductile cast iron melt for the shaft portion was 1450° C. Ultrasonic inspection convinced that the shaft portion and the intermediate layer were soundly fused to each other without defects.

After the solidification of the shaft portion was completed, the stationary casting mold was disassembled to take out the resultant composite roll, which was subject to tempering at 500° C. for 10 hours. Thus obtained was the composite roll in each of Examples and Comparative Examples.

In each outer layer, the composition is shown in Tables 1-1 and 1-2, and Nb/V, Mo/V, Mo/Cr, (V+1.2Nb), (Mo+0.5W), the value on the right side of the following formula (1), and the value on the left side of the following formula (2) are shown in Table 1-3.

$$Si \leq 3.2/[0.283(C-0.2V-0.13Nb)+0.62] \quad (1)$$

$$(C-0.2V-0.13Nb)+(Cr+Mo+0.5W) \leq 9.5 \quad (2)$$

TABLE 1-1

| | Composition of Outer Layer (% by mass) | | | | | | |
|---|---|---|---|---|---|---|---|
| No. | C | Si | Mn | Ni | Cr | Mo | V | Nb |
| Example 1 | 2.54 | 2.36 | 0.40 | 3.94 | 1.06 | 4.01 | 3.11 | 0.59 |
| Example 2 | 3.23 | 1.87 | 0.79 | 3.81 | 0.94 | 4.42 | 3.68 | 0.65 |
| Example 3 | 3.32 | 1.58 | 0.82 | 4.17 | 0.81 | 2.66 | 2.23 | 0.56 |
| Example 4 | 2.86 | 2.10 | 0.68 | 4.43 | 0.83 | 2.89 | 2.67 | 0.92 |
| Example 5 | 3.20 | 1.62 | 0.83 | 4.12 | 1.48 | 2.85 | 2.43 | 0.25 |
| Example 6 | 3.15 | 1.40 | 0.95 | 4.27 | 1.40 | 3.24 | 2.11 | 1.10 |
| Example 7 | 2.94 | 1.79 | 0.67 | 4.38 | 1.22 | 2.57 | 3.16 | 0.79 |
| Com. Ex. 1 | 3.39 | 2.47 | 0.67 | 4.10 | 1.68 | 2.91 | 2.84 | 0.43 |
| Com. Ex. 2 | 3.47 | 1.92 | 0.91 | 3.62 | 1.94 | 4.31 | 1.84 | 0.31 |
| Com. Ex. 3 | 2.88 | 1.43 | 0.49 | 4.41 | 1.70 | 3.20 | 1.61 | 0.10 |
| Com. Ex. 4 | 1.89 | 2.31 | 0.46 | 3.97 | 1.21 | 4.03 | 3.09 | 0.37 |
| Com. Ex. 5 | 2.57 | 1.98 | 0.52 | 3.56 | 1.06 | 1.85 | 3.34 | 0.62 |

TABLE 1-2

| | Composition of Outer Layer (% by mass) | | | | | |
|---|---|---|---|---|---|---|
| No. | W | Ti | Al | Zr | Co | B |
| Example 1 | — | 0.029 | 0.021 | — | — | 0.0024 |
| Example 2 | 0.88 | 0.019 | — | — | — | — |
| Example 3 | 0.12 | 0.010 | — | — | — | 0.0075 |
| Example 4 | 3.84 | 0.162 | 0.096 | 0.063 | — | 0.0084 |
| Example 5 | 0.30 | — | — | — | 1.3 | 0.0005 |
| Example 6 | 1.38 | 0.052 | — | 0.082 | 3.68 | 0.0013 |
| Example 7 | 0.74 | — | 0.068 | — | — | — |
| Com. Ex. 1 | 0.88 | 0.042 | — | 0.038 | — | 0.0026 |
| Com. Ex. 2 | 1.86 | 0.017 | — | — | — | — |
| Com. Ex. 3 | 0.15 | 0.02 | 0.049 | — | — | 0.0006 |
| Com. Ex. 4 | 0.8 | 0.035 | — | — | 4.21 | 0.0016 |
| Com. Ex. 5 | 0.87 | 0.032 | — | — | — | 0.0075 |

TABLE 1-3

| | Composition of Outer Layer (% by mass) | | | | | | |
|---|---|---|---|---|---|---|---|
| No. | Nb/V | Mo/V | Mo/Cr | V + 1.2 Nb | Mo + 0.5 W | Formula (1)[1] | Formula (2)[2] |
| Example 1 | 0.19 | 1.29 | 3.78 | 3.82 | 4.01 | 2.80 | 6.91 |
| Example 2 | 0.18 | 1.20 | 4.70 | 4.46 | 4.86 | 2.46 | 8.21 |
| Example 3 | 0.25 | 1.19 | 3.28 | 2.90 | 2.72 | 2.27 | 6.33 |
| Example 4 | 0.34 | 1.08 | 3.48 | 3.77 | 4.81 | 2.57 | 7.85 |
| Example 5 | 0.10 | 1.17 | 1.93 | 2.73 | 3.00 | 2.32 | 7.16 |
| Example 6 | 0.52 | 1.54 | 2.31 | 3.43 | 3.93 | 2.37 | 7.92 |
| Example 7 | 0.25 | 0.81 | 2.11 | 4.11 | 2.94 | 2.57 | 6.37 |
| Com. Ex. 1 | 0.15 | 1.02 | 1.73 | 3.36 | 3.35 | 2.28 | 7.80 |
| Com. Ex. 2 | 0.17 | 2.34 | 2.22 | 2.21 | 5.24 | 2.15 | 10.24 |
| Com. Ex. 3 | 0.06 | 1.99 | 1.88 | 1.73 | 3.28 | 2.39 | 7.52 |
| Com. Ex. 4 | 0.12 | 1.30 | 3.33 | 3.53 | 4.43 | 3.31 | 6.86 |
| Com. Ex. 5 | 0.19 | 0.55 | 1.75 | 4.08 | 2.15 | 2.82 | 5.17 |

Note:
[1] Values on the right side of the above formula (1).
[2] Values on the left side of the above formula (2).

(2) Measurement of Structure (a) Area Ratios of Graphite Particles and MC Carbides in Outer Layer A test piece was cut out of the outer layer of the composite roll of each of Examples and Comparative Examples at a position separate from a roll body end surface by about 100 mm in a longitudinal direction, and its optical photomicrograph was obtained to measure the area ratios of graphite particles and MC carbides by image analysis software.

(b) Si Content (% by Mass) in Outer Layer Matrix

With respect to a test piece cut out of the outer layer of the composite roll of each of Examples and Comparative Examples at a position separate from a roll body end surface by about 100 mm in a longitudinal direction, the Si content in its matrix was measured by an energy dispersive X-ray spectrometer (EDX).

(c) Uniformity of Structure

In each of Examples and Comparative Examples, exposed surfaces of the outer layer at depths of 10 mm, 30 mm and 50 mm, respectively, from the outer surface, were mirror-polished at a position separate from a roll body end surface by about 100 mm in a longitudinal direction, and etched by an aqueous ammonium persulfate solution for about 1 minute to take a photomicrograph (magnification: 5-10 times) of its structure. On each photomicrograph of the structure, the speck-like segregated dendrites of bainite and/or martensite having diameters of 1.5 mm or more were observed to evaluate the uniformity of the structure by the following standards.

Good: There were no speck-like segregated dendrites with diameters of 1.5 mm or more.

Poor: There were speck-like segregated dendrites with diameters of 1.5 mm or more.

(d) Area Ratio (%) of Ferrite in Shaft Portion (Journal Portion)

A test piece was cut out of the shaft portion (journal portion) of the composite roll of each of Examples and Comparative Examples, and its optical photomicrograph was obtained to measure the area ratio (%) of ferrite by image analysis software.

Figure 6:
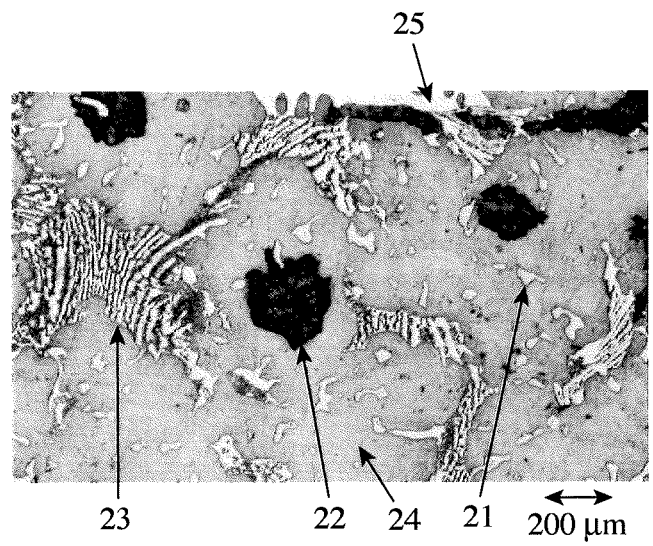
FIG. 6 is a photomicrograph showing the metal structure of the outer layer of Example 1.

FIG. 6 is a photomicrograph showing the metal structure of the outer layer of Example 1, which was etched by Picral as an etchant. In FIG. 6, 21 represents MC carbides, 22 represents graphite, 23 represents $M_6C$ carbides, 24 represents a matrix, and 25 represents cementite.

(3) Measurement of Properties (a) Fracture Toughness ($K_{IC}$) of Outer Layer

Figure 7:
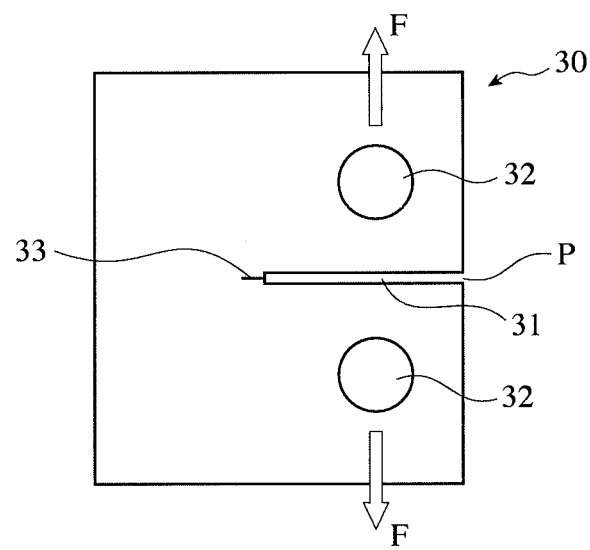
FIG. 7 is a schematic front view showing a fracture-toughness-measuring test piece.

With respect to the composite roll of each of Examples and Comparative Examples, the fracture toughness $K_{IC}$ of its outer layer was measured according to ASTM E399. A test piece 30 (48 mm×50 mm×15 mm) was cut out of the outer layer of each composite roll at a position separate from a roll body end surface by about 100 mm in a longitudinal direction, to measure the fracture toughness $K_{IC}$ according to ASTM E399. As shown in FIG. 7, the test piece 30 had a center notch 31 extending in parallel with the outer layer surface of the roll, and holding holes 32, 32 positioned on both sides of the notch 31. Weak stresses F, F were applied to the test piece 30 by members engaging the holes 32, 32 in directions of opening the notch 31, generating a crack 33 at a bottom of the notch 31. Stresses F, F in directions of opening the notch 31 were applied to the test piece 30 again to propagate the crack 33, to measure crack-opening displacement at an opening end P of the notch 31 until the test piece 30 was fractured. The fracture toughness $K_{IC}$ (MPa·m$^{1/2}$) was determined from the stress and the crack-opening displacement.

(b) Vickers Hardness (Hv) of Outer Layer Matrix

A test piece was cut out of the outer layer of the composite roll of each of Examples and Comparative Examples at a position separate from a roll body end surface by about 100 mm in a longitudinal direction, to measure the Vickers hardness of its matrix at a load of 200 g by a Microvickers hardness tester.

(c) Shore Hardness (Hs) of Outer Layer

With respect to the composite roll of each of Examples and Comparative Examples, the Shore hardness of an outer layer surface was measured at a position corresponding to the initial diameter of the product by a Shore hardness tester.

(d) Residual Compression Stress (MPa) of Outer Layer at Discard Diameter

The outer layer of the composite roll of each of Examples and Comparative Examples was machined to a discard diameter (at depth of 50 mm from the initial diameter of the product) in a longitudinal roll center portion. The circumferential residual compression stress of the outer layer surface of each composite roll at the discard diameter and the longitudinal roll center was measured by an X-ray diffraction residual stress meter.

The structure measurement results are shown in Table 2, and the measurement results of properties are shown in Table 3.

TABLE 2

| No. | Outer Layer | | | | Shaft Portion Area |
|---|---|---|---|---|---|
| | Area Ratio (%) | | Si Content in Matrix (% by mass) | Uniformity of Structure [1] | Ratio of Ferrite (%) |
| | Graphite Particles | MC carbides | | | |
| Example 1 | 1.17 | 10.06 | 2.69 | Good | 18.6 |
| Example 2 | 0.99 | 11.31 | 2.43 | Good | 1.2 |
| Example 3 | 2.92 | 5.27 | 2.23 | Good | 28.1 |
| Example 4 | 1.86 | 6.57 | 2.61 | Good | 22.7 |
| Example 5 | 1.67 | 5.00 | 2.23 | Good | 22.2 |
| Example 6 | 0.88 | 5.33 | 2.01 | Good | 3.0 |
| Example 7 | 1.85 | 6.80 | 2.31 | Good | 23.4 |
| Com. Ex. 1 | 3.36 | 7.24 | 3.40 | Poor | 35.6 |
| Com. Ex. 2 | 1.78 | 6.92 | 2.72 | Good | 14.1 |
| Com. Ex. 3 | 1.08 | 1.29 | 2.02 | Good | 18.5 |
| Com. Ex. 4 | 0.12 | 9.56 | 2.36 | Poor | 19.4 |
| Com. Ex. 5 | 0.28 | 11.48 | 2.24 | Poor | 27.3 |
| Example 8 | 2.41 | 10.06 | 2.27 | Good | 23.1 |
| Example 9 | 2.43 | 11.31 | 2.30 | Good | 22.5 |

Note:
[1] Judged by the presence or absence of speck-like segregated dendrites having diameters of 1.5 mm or more.

TABLE 3

| | Outer Layer | | | |
|---|---|---|---|---|
| No. | $K_{IC}$ [1] (MPa·m$^{1/2}$) | Vickers Hardness of Matrix (Hv) | Shore hardness (Hs) | Residual Compression Stress[2] (MPa) |
| Example 1 | 21.7 | 640 | 77.2 | 354 |
| Example 2 | 20.5 | 655 | 83.8 | 287 |
| Example 3 | 23.5 | 572 | 76.9 | 244 |
| Example 4 | 21.5 | 621 | 77.9 | 315 |
| Example 5 | 22.1 | 599 | 78.4 | 256 |
| Example 6 | 21.0 | 614 | 79.5 | 271 |
| Example 7 | 23.4 | 607 | 77.3 | 306 |
| Com. Ex. 1 | 17.9 | 587 | 78.8 | 247 |
| Com. Ex. 2 | 17.1 | 644 | 84.6 | 311 |
| Com. Ex. 3 | 21.1 | 602 | 76.3 | 274 |
| Com. Ex. 4 | 22.3 | 532 | 72.8 | 453 |
| Com. Ex. 5 | 24.1 | 591 | 73.0 | 284 |
| Example 8 | 22.4 | 618 | 77.5 | 190 |
| Example 9 | 21.5 | 620 | 78.1 | 186 |

Note:
[1] Fracture toughness ($K_{IC}$).
[2] Residual compression stress at a discard diameter.

(4) Performance Test

Using an outer layer material in each of Examples and Comparative Examples, a sleeve-type test roll of 60 mm in outer diameter, 40 mm in inner diameter and 40 mm in width was produced. To evaluate the wear resistance, each test roll was subjected to a wearing test using a rolling wear test machine shown in FIG. 2. The rolling wear test machine comprises a mill 1, test rolls 2, 3 assembled in the mill 1, a heating furnace 4 for preheating a strip 8 to be rolled, a water bath 5 for cooling the strip 8, a coiler 6 for giving a constant tension to the strip 8 during rolling, and a controller 7 for adjusting the tension. The wearing conditions by rolling are as follows. After rolling, the depth of wear on the test roll was measured by a stylus-type surface roughness meter. The results are shown in Table 4.

Strip to be rolled: SUS304,
Compression ratio: 25%,
Rolling speed: 150 m/minute,
Temperature of strip to be rolled: 900° C.,
Length of strip rolled: 300 m/pass,
Cooling of roll: water, and
Number of rolls in each stand: 4.

To evaluate the sticking resistance, A sticking test was conducted on each test roll using a friction heat shock tester shown in FIG. 3. In the friction heat shock tester, a weight 12 is dropped onto a rack 11 to rotate a pinion 13, such that a biting member 15 comes into strong contact with a test material piece 14. The sticking was evaluated by the following standards. The results are shown in Table 4. Smaller sticking means higher sticking resistance.

Good: No sticking.
Fair: Slight sticking.
Poor: extreme sticking.

TABLE 4

| | Outer Layer | |
|---|---|---|
| No. | Wear Depth (μm) | Sticking |
| Example 1 | 2.21 | Good |
| Example 2 | 1.89 | Good |
| Example 3 | 2.59 | Good |
| Example 4 | 1.66 | Good |

TABLE 4-continued

| | Outer Layer | |
|---|---|---|
| No. | Wear Depth (μm) | Sticking |
| Example 5 | 2.54 | Good |
| Example 6 | 2.04 | Good |
| Example 7 | 2.24 | Good |
| Com. Ex. 1 | 2.61 | Good |
| Com. Ex. 2 | 2.01 | Fair |
| Com. Ex. 3 | 3.11 | Good |
| Com. Ex. 4 | 2.24 | Poor |
| Com. Ex. 5 | 2.43 | Poor |
| Example 8 | 1.90 | Good |
| Example 9 | 2.05 | Good |

As is clear from Tables 2-4, in Examples 1-7, any outer layer had an area ratio of graphite particles in a range of 0.3-10%, an area ratio of MC carbides in a range of 3-20%, an Si content of 3.2% or less by mass in the matrix, and excellent uniformity in the structure; and any shaft portion (journal portion) had an area ratio of ferrite in a range of 35% or less. Further, any outer layer of Examples 1-7 had fracture toughness of 18.5 MPa·m$^{1/2}$ or more, Vickers hardness of 560 or more in the matrix, and residual compression stress of 150-500 MPa at the discard diameter, exhibiting excellent wear resistance, sticking resistance and accident resistance.

On the other hand, the outer layer of Comparative Example 1 had as low fracture toughness as 17.9 MPa·m$^{1/2}$, and as relatively large wear depth (wear resistance) as 2.61 μm. The outer layer of Comparative Example 2 had as low fracture toughness as 17.1 MPa·m$^{1/2}$, and insufficient sticking resistance. The outer layer of Comparative Example 3 had as large wear depth as 3.11 μm because the area ratio of MC carbides was 1.29%. The outer layer of Comparative Example 4 had as low Vickers hardness Hv as 532 in the matrix, poor uniformity in the structure, and poor sticking resistance because the area ratio of graphite particles was as small as 0.12%. The outer layer of Comparative Example 5 had poor uniformity in the structure, and poor sticking resistance because the area ratio of graphite particles was as small as 0.28%.

EXAMPLE 8

By the same method as in Examples 1-7, an outer layer melt and an intermediate layer melt each having the composition shown in Table 5 were poured into a centrifugally casting cylindrical mold of 760 mm in inner diameter, 2700 mm in length and 320 mm in thickness, which was made of ductile cast iron, and coated with a 3-mm-thick zircon-based facing material on the inner surface, to form an outer layer having an average thickness of 91 mm, and an intermediate layer having an average thickness of 20 mm by a centrifugally casting method. Thereafter, a shaft portion was formed by the same method as in Examples 1-7. A test piece was cut out of the resultant composite roll at a position separate from a roll body end surface by about 100 mm in a longitudinal direction, to measure the distributions of Cr, V and Nb near the intermediate layer. The results are shown in FIG. 5-1.

TABLE 5

| | Amount (% by mass) | | |
|---|---|---|---|
| Element | Outer Layer | Intermediate Layer | Shaft Portion |
| C | 3.29 | 3.15 | 3.39 |
| Si | 1.64 | 1.49 | 2.63 |
| Mn | 0.79 | 0.80 | 0.42 |
| Ni | 4.16 | 3.23 | 0.41 |
| Cr | 1.09 | 1.35 | 0.10 |
| Mo | 2.95 | 0.17 | 0.02 |
| V | 2.82 | 0.05 | 0.02 |
| Nb | 0.66 | — | — |
| W | 0.97 | — | — |
| Mg | — | — | 0.06 |

Figures 1, 5:
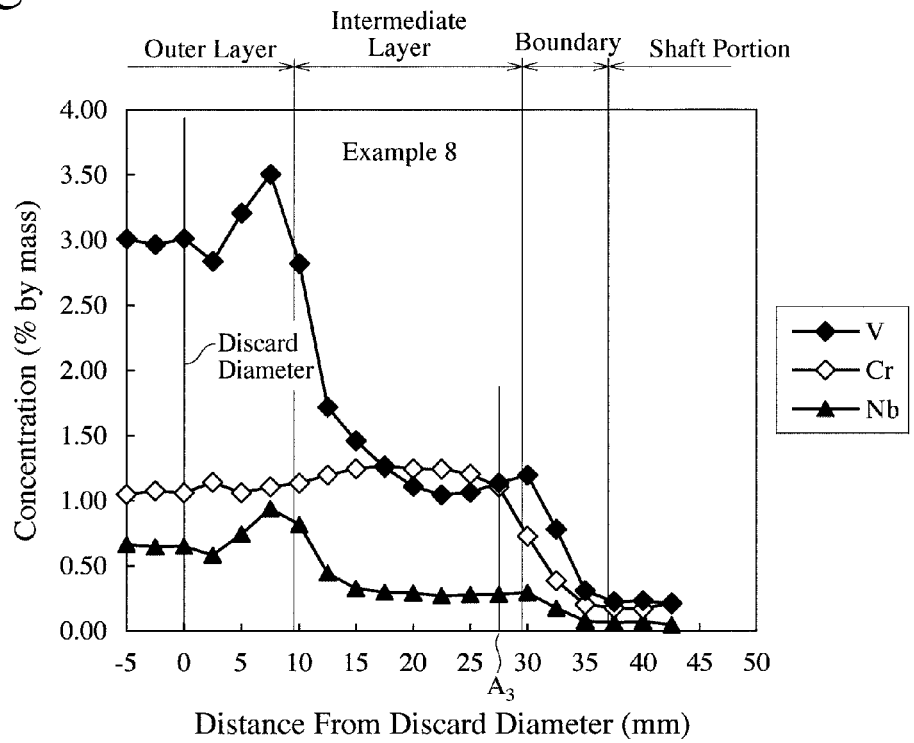
Figures 2, 5:
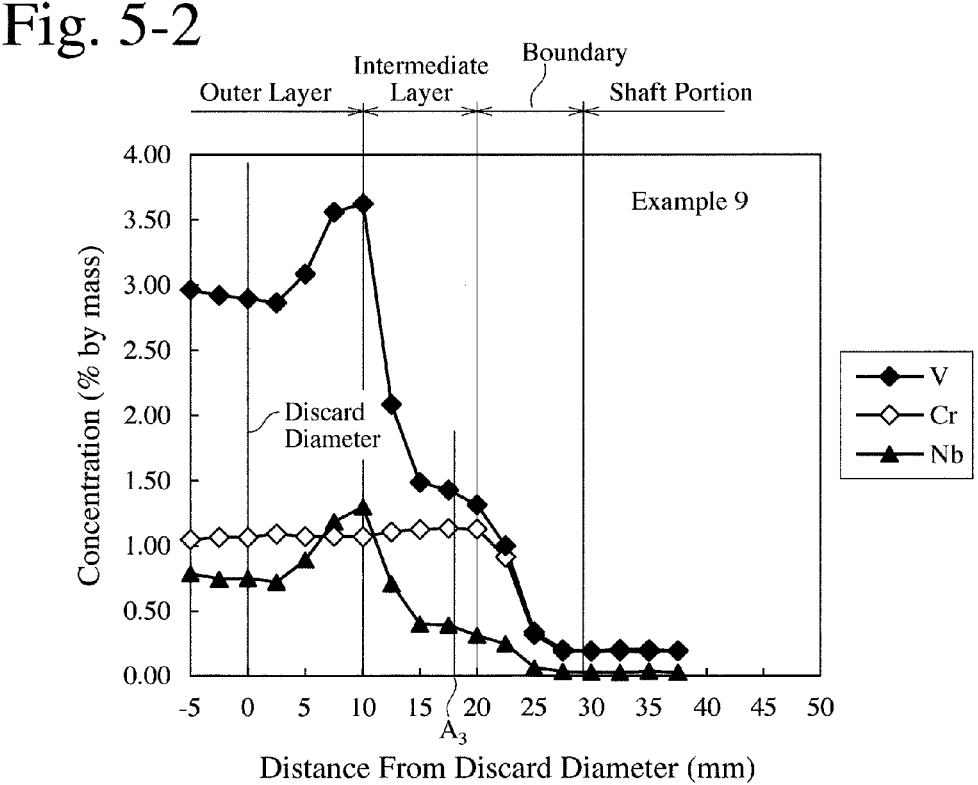

As is clear from FIG. 5-1, the distance between the discard diameter and a boundary end (A$_3$) was about 28 mm. Table 6 shows each amount of Cr, V and Nb and the total amount of V and Nb, at the discard diameter of the outer layer and near the boundary with the shaft portion in the intermediate layer, as well as a ratio of the Cr content near the boundary/the Cr content at the discard diameter, and a ratio of the total amount of V and Nb near the boundary/the total amount of V and Nb at the discard diameter.

TABLE 6

| Item | Measurement Position | Cr | V | Nb | V + Nb |
|---|---|---|---|---|---|
| Amount of Elements (% by mass) | Discard Diameter | 1.06 | 3.01 | 0.66 | 3.67 |
| | Near Boundary | 1.11 | 1.13 | 0.28 | 1.41 |
| Near Boundary/Discard Diameter (%) | | 105 | 38 | 42 | 38 |

EXAMPLE 9

By the same method as in Examples 1-7, an outer layer melt and an intermediate layer melt each having the composition shown in Table 7 were poured into a centrifugally casting cylindrical mold of 795 mm in inner diameter, 2700 mm in length and 302.5 mm in thickness, which was made of ductile cast iron, and coated with a 3-mm-thick zircon-based facing material in the inner surface, to form an outer layer having an average thickness of 85 mm, and an intermediate layer having an average thickness of 10 mm by a centrifugally casting method. Thereafter, a shaft portion was formed by the same method as in Examples 1-7. A test piece was cut out of the resultant composite roll at a position separate from the roll body end surface by about 100 mm in a longitudinal direction, to measure the distributions of Cr, V and Nb near the intermediate layer. The results are shown in FIG. 5-2.

TABLE 7

| | Amount (% by mass) | | |
|---|---|---|---|
| Element | Outer Layer | Intermediate Layer | Shaft Portion |
| C | 3.28 | 3.12 | 3.36 |
| Si | 1.66 | 1.50 | 2.55 |
| Mn | 0.79 | 0.80 | 0.47 |
| Ni | 4.17 | 3.19 | 0.49 |
| Cr | 1.10 | 1.33 | 0.12 |
| Mo | 2.93 | 0.21 | 0.03 |
| V | 2.83 | 0.06 | 0.03 |
| Nb | 0.71 | — | — |
| W | 1.00 | — | — |
| Mg | — | — | 0.06 |

As is clear from FIG. 5-2, the distance between the discard diameter and the boundary end (A₃) was 18 mm. Table 8 shows each amount of Cr, V and Nb and the total amount of V and Nb at the discard diameter of the outer layer and near the boundary with the shaft portion in the intermediate layer, as well as a ratio of the Cr content near the boundary/the Cr content at the discard diameter position, and a ratio of the total amount of V and Nb near the boundary/the total amount of V and Nb at the discard diameter.

TABLE 8

| Item | Measurement Position | Cr | V | Nb | V + Nb |
|---|---|---|---|---|---|
| Amount of Element (% by mass) | At Discard Diameter | 1.06 | 2.89 | 0.75 | 3.64 |
|  | Near Boundary | 1.13 | 1.42 | 0.39 | 1.81 |
| Near boundary/at Discard Diameter (%) |  | 107 | 49 | 52 | 50 |

As is clear from FIGS. 5-1 and 5-2 and Tables 6 and 8, in any of Examples 8 and 9, (a) the total amount of V and Nb in the intermediate layer near the boundary with the shaft portion was 70% or less of that at the discard diameter of the outer layer, and (b) the Cr content in the intermediate layer near the boundary with the shaft portion was 80% or more of that at the discard diameter. In any of Examples 8 and 9, ultrasonic inspection convinced that the shaft portion and the intermediate layer were soundly fused to each other without defects.

The structure and properties of the centrifugally cast composite rolls of Examples 8 and 9 were measured by the same methods as in Examples 1-7. The structure measurement results are shown in Table 2, and the measurement results of the properties are shown in Table 3. As is clear from Tables 2 and 3, in Examples 8 and 9, too, the outer layers had area ratios of graphite in a range of 0.3-10%, and Si contents of 3.2% or less by mass in the matrix, excellent uniformity in the structure, and the shaft portions (journal portions) had area ratios of ferrite in a range of 35% or less. Further, the outer layers of Examples 8 and 9 had fracture toughness of 18.5 MPa·m$^{1/2}$ or more, Vickers hardness of 560 or more in the matrix, and residual compression stress in a range of 150-500 MPa at the discard diameter.

The performance test of the centrifugally cast composite rolls of Examples 8 and 9 was conducted in the same manner as in Examples 1-7. The performance test results are shown in Table 4. As is clear from Table 4, the outer layers of Examples 8 and 9 also had excellent wear resistance, sticking resistance and accident resistance.

EFFECT OF THE INVENTION

The centrifugally cast composite roll of the present invention has not only excellent wear resistance and sticking resistance, but also excellent accident resistance because of high fracture toughness, with good fusion between the outer layer, the intermediate layer and the shaft portion. The outer layer contains few speck-like segregated dendrites of bainite and/or martensite, having excellent radial uniformity in the structure. In the case of poor uniformity, speck-like segregations of carbide-depleted dendrites are more worn than the matrix structure, and worn portions are transferred like specks to a rolled strip surface, providing the rolled products with poor quality. The use of the centrifugally cast composite roll of the present invention having excellent uniformity can prevent such quality deterioration of the rolled products.

DESCRIPTION OF SYMBOLS

1 Mill.
2 Test roll.
3 Test roll.
4 Heating furnace.
5 Cooling water bath.
6 Coiler.
7 Controller.
11 Rack.
12 Weight.
13 Pinion.
14 Test material piece.
15 Biting member.
20 Boundary end.
21 MC carbides.
22 Graphite.
23 M₆C carbides.
24 Matrix.
25 Cementite.

What is claimed is:

1. A centrifugally cast hot-rolling composite roll comprising (a) an outer layer made of cast iron having a chemical composition comprising by mass 2.5-3.5% of C, 1.3-2.4% of Si, 0.2-1.5% of Mn, 3.5-5.0% of Ni, 0.8-1.5% of Cr, 2.5-5.0% of Mo, 1.8-4.0% of V, and 0.2-1.5% of Nb, the balance being Fe and inevitable impurities, a mass ratio of Nb/V being 0.1-0.7, and a mass ratio of Mo/V being 0.7-2.5, and meeting the condition of 2.5≤V+1.2 Nb≤5.5, and having a structure comprising 0.3-10% by area of a graphite phase; (b) a shaft portion made of ductile cast iron; and (c) an intermediate cast iron layer.

2. The centrifugally cast hot-rolling composite roll according to claim 1, wherein the total amount of V and Nb in said intermediate layer near the boundary with the shaft portion is 70% or less of that at said discard diameter of the outer layer; and wherein the Cr content in said intermediate layer near the boundary with the shaft portion is 80% or more of that at said discard diameter of the outer layer.

3. The centrifugally cast hot-rolling composite roll according to claim 2, wherein said outer layer further comprises 0.1-5.0% of W.

4. The centrifugally cast hot-rolling composite roll according to claim 3, wherein the chemical composition of said outer layer meets the conditions of the following formulae (1)-(3):

$$Si \leq 3.2/[0.283(C-0.2V-0.13Nb)+0.62] \quad (1),$$

$$(C-0.2V-0.13Nb)+(Cr+Mo+0.5W) \leq 9.5 \quad (2), \text{ and}$$

$$1.5 \leq Mo+0.5W \leq 5.5 \quad (3).$$

5. The centrifugally cast hot-rolling composite roll according to claim 1, wherein said outer layer further comprises 0.1-5.0% of W.

6. The centrifugally cast hot-rolling composite roll according to claim 5, wherein the chemical composition of said outer layer meets the conditions of the following formulae (1)-(3):

$$Si \leq 3.2/[0.283(C-0.2V-0.13Nb)+0.62] \quad (1),$$

$$(C-0.2V-0.13Nb)+(Cr+Mo+0.5W) \leq 9.5 \quad (2), \text{ and}$$

$$1.5 \leq Mo+0.5W \leq 5.5 \quad (3).$$

7. The centrifugally cast hot-rolling composite roll according to claim 1, wherein said outer layer further comprises at least one selected from the group consisting of 0.003-5.0% of Ti, 0.01-2.0% of Al, 0.01-0.5% of Zr, 0.001-0.5% of B, and 0.1-10.0% of Co by mass.

8. The centrifugally cast hot-rolling composite roll according to claim 1, wherein the matrix of said outer layer has Vickers hardness of 560 or more.

9. The centrifugally cast hot-rolling composite roll according to claim 1, wherein the circumferential residual compression stress of said outer layer surface at a longitudinal roll center is 150-500 MPa at a discard diameter.

10. The centrifugally cast hot-rolling composite roll according to claim 1, wherein the said outer layer has fracture toughness $K_{IC}$ of 18.5 MPa·m$^{1/2}$ or more.

11. The centrifugally cast hot-rolling composite roll according to claim 1, wherein the matrix of said outer layer contains 3.2% or less by mass of Si.

* * * * *